(12) United States Patent
Merritt (10) Patent No.: US 8,180,376 B1
(45) Date of Patent: May 15, 2012

(54) MOBILE ANALYTICS TRACKING AND REPORTING

(75) Inventor: Arthur Merritt, San Francisco, CA (US)

(73) Assignee: Nokia Corporation, Espoo (FI)

( * ) Notice: Subject to any disclaimer, the term of this patent is extended or adjusted under 35 U.S.C. 154(b) by 461 days.

(21) Appl. No.: 12/434,106

(22) Filed: May 1, 2009

Related U.S. Application Data (60) Provisional application No. 61/049,764, filed on May 1, 2008.

(51) Int. Cl.
*H04W 24/00* (2009.01)
(52) U.S. Cl. .............. 455/456.3; 455/456.2; 455/457
(58) Field of Classification Search .......... 455/457; 709/229; 713/167
See application file for complete search history.

(56) References Cited

U.S. PATENT DOCUMENTS

| 2002/0138635 | A1* | 9/2002 | Redlich et al. | 709/229 |
| 2006/0206709 | A1* | 9/2006 | Labrou et al. | 713/167 |

FOREIGN PATENT DOCUMENTS

JP 2009086854 A * 4/2009

OTHER PUBLICATIONS

Bournique, D., "Admob Launches Mobile Analytics Suite," Apr. 30, 2008, [Online] [Retrieved Jun. 25, 2010] Retrieved from the Internet <URL:http://wapreview.com/blog/?p=544>.
Meunier, B., "The Mobile SEO's Guide to Mobile Analytics," Feb. 27, 2008, [Online] [Retrieved Jun. 25, 2010] Retrieved from the Internet <URL:http://www.brysonmeunier.com/the-mobile-seo-s-guide-to-mobile-analytics/>.

* cited by examiner

*Primary Examiner* — David Q Nguyen
(74) *Attorney, Agent, or Firm* — Ditthavong Mori & Steiner, P.C.

(57) ABSTRACT

Mobile analytics data gathered from Internet sites accessed via mobile devices is tracked and reported. A tracking package at the publisher's server collects unique user, device and page data when a web page is accessed. The tracking package communicates the collected data to a tracking server that logs the data along with a unique identifier for the mobile device request. The tracking package includes the unique identifier in a beacon module that is embedded into the publisher's web page that is delivered to the mobile device. The beacon module at the mobile device communicates the unique identifier along with additional identification and/or usage data to the tracking server. The tracking server stores the additional identification and/or usage data associated with the unique identifier so that the additional data can be correlated to the data initially collected by the tracking package. A reporting server processes the stored data and generates reports.

22 Claims, 8 Drawing Sheets

MOBILE ANALYTICS TRACKING AND REPORTING

CROSS-REFERENCE TO RELATED APPLICATION

This application claims the benefit of U.S. Provisional Patent Application No. 61/049,764, filed May 1, 2008, which is hereby incorporated by reference in its entirety.

BACKGROUND

1. Field of the Invention

The present invention relates to tracking and reporting usage data from mobile device-specific Internet sites as well as from Internet sites accessed through the mobile web or on mobile devices.

2. Description of the Related Art

Although the processes used by conventional Internet analytics tools to track and report usage statistics vary, the tools fall into two main groups. The first group includes tools that track data through a web service. The second group includes tools that process raw log files from a server.

Some analytics tools, especially those that track data through a web service, involve technologies, programming languages, and features that are only available or supported on Internet sites accessed through traditional PC-based web browsers. These mechanisms are not supported on mobile device-specific Internet sites or sites accessed through mobile browsers on hand-held devices, cell phones, and other non-PC-based browsers. For example, tracking "cookies" used by Internet sites are removed by some carrier gateways prior to reaching the user and are not supported on all mobile devices. Redirect algorithms in which a user is first directed to a tracking site and then to the destination site do not work on all devices, can cause devices to crash, and can result in poor performance due to the slow nature of redirecting from one site to the next, especially over mobile networks. Thus, these tools are not able to accurately report data across the wide array of device types accessing a mobile device-specific Internet site.

Tools that process raw log files require access to a publisher's raw log files, which some publishers may not have access to or may have distributed on multiple machines. Thus, the processing of these log files is often expensive, time consuming, and may require coordination for distributed logs. In addition to these challenges, the conventional methods used to aggregate data about visitors when processing these raw log files do not work well for logs from sites accessed by mobile users. Specifically, any algorithm that makes use of IP addresses to attempt to uniquely identify users is not well suited for mobile users, because most mobile users access the Internet through a carrier gateway proxy that will show the same IP address for multiple users.

As a further drawback, conventional tools and services, whether tracking data through a web service or by processing raw log files from a server, do not track or report data specific to mobile usage or arising from mobile devices, mobile browsers, and mobile carrier gateways, including but not limited to device capabilities, carrier gateway information, and device header information.

SUMMARY

Embodiments of the invention provide methods, systems, and computer-readable media for tracking and reporting mobile analytics data gathered from Internet sites accessed via mobile devices. A tracking package at the publisher's server collects unique user, device, and page data when a web page is accessed. The tracking package communicates the collected data to a tracking server. The tracking server logs the collected data along with a unique identifier for the request from the mobile device. The tracking server sends the unique identifier for the mobile device request to the tracking package at the publisher's server. The tracking package includes the unique identifier in a beacon module that is embedded into the publisher's web page that is delivered to the mobile device. The beacon module at the mobile device communicates the unique identifier for the mobile device request along with additional identification and/or usage data to the tracking server. The tracking server stores the additional identification and/or usage data associated with the unique identifier so that the additional data can be correlated to the data initially collected by the tracking package. A reporting server processes the stored data and generates customizable reports.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
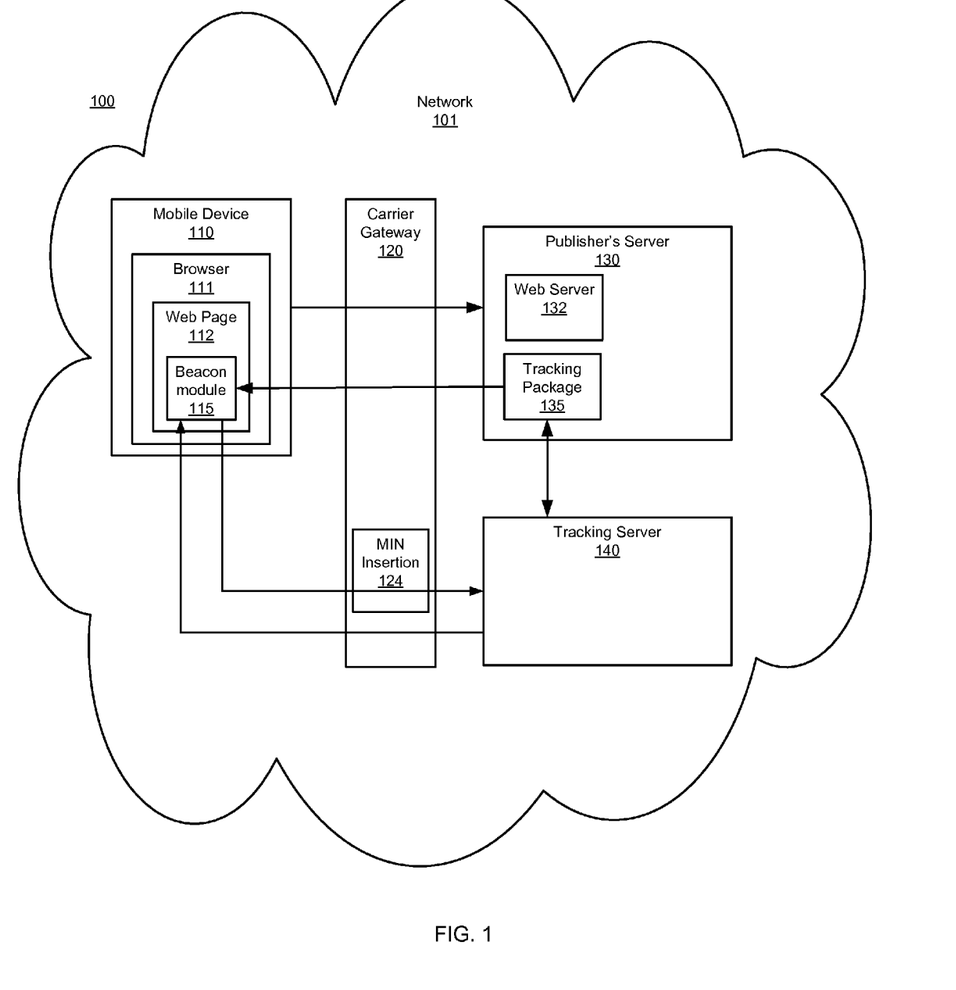
FIG. 1 is a high-level block diagram of the computing environment in accordance with an embodiment of the invention.

FIG. 1 is a high-level block diagram of the computing environment 100 in accordance with an embodiment of the invention. The computing environment 100 includes a publisher's server 130 and tracking server 140 that communicate with a mobile device 110 through a carrier gateway 120. The publisher's server 130, the tracking server 140 and the mobile device 110 are connected via the network 101. The network 101 is a communications network such as a local area network, a wide area network, a wireless network, an intranet, or the Internet. Although only one mobile device 110 and one carrier gateway 120 is shown in FIG. 1 for clarity, any number and type of mobile devices and respective carrier gateways may be used to access web pages 112 served by a publisher's server 130. Similarly, although only one publisher's server 130 is shown in FIG. 1 for clarity, any number of publisher's servers may communicate with the tracking server 140, and the tracking server 140 may comprise any number of servers.

In various embodiments, the mobile device 110 may be any device capable of accessing the Internet either directly or indirectly through a proxy, gateway, or the like. Examples of a mobile device 110 include a personal digital assistant (PDA), a mobile phone, laptop or a computer. The mobile device 110 includes a browser 111 that enables the mobile device 110 to locate, display and interact with text, images, video, music, games, and/or other information in a web page 112. In one embodiment, browser 111 is a web browser designed for use on a mobile device, referred to as a "mobile web browser." The mobile web browser may be configured to effectively display web content on small screens, and/or may be configured to accommodate the low memory capacity and/or the low-bandwidth of some mobile devices.

In some implementations, the carrier gateway 120 is a proxy server used to marshal requests between mobile devices and servers. The mobile device 110 may wirelessly communicate through the carrier gateway 120. In the illustrated embodiment of FIG. 1, the carrier gateway 120 is connected to the network 101 so as to provide a communication path from the mobile device 110 to the publisher's server 130. The carrier gateway 120 may be specific to the type of the mobile device 110 and/or specific to the service provider that provides the communications link from the mobile device 110 to the Internet. Other types of mobile devices 110 using other service providers may use other types of carrier gateways 120. In the embodiment shown in FIG. 1, the carrier gateway 120 includes a Mobile Identification Number (MIN) insertion mechanism 124. The MIN is a unique identifier of a mobile device 110. The MIN insertion mechanism 124 inserts a MIN into the header stream of the mobile device's 110 communication to a server, and allows the server to uniquely identify the mobile device 110 using the MIN. Thus, in one embodiment, when a beacon module 115 embedded in the web page 112 is activated as the web page 112 loads in the browser 111, the beacon module 115 initiates contact with the tracking server 140. The MIN insertion mechanism 124 of the carrier gateway 120 inserts the MIN into the communication from the mobile device 110 so that the tracking server 140 can uniquely identify the mobile device 110 for use in tracking. In some cases, the carrier gateway 120 only inserts the MIN into the communication from the mobile device 110 to servers on an approved list (i.e., "whitelisted" servers), and in other cases, the carrier gateway 120 may insert the MIN into all communications from the mobile device 110.

The publisher's server 130 includes a web server 132 that can serve a web page 112 to a requesting device. The publisher's server 130 also includes a tracking package 135 that communicates with the tracking server 140 to transmit data that is collected at the publisher's server 130 from mobile devices 110 that access the publisher's web page 112. In one embodiment, the tracking package 135 also inserts a beacon module 115 containing a unique identifier for the mobile device request 110 into the web page 112 that can be used for additional tracking of information associated with the mobile device 110.

The tracking server 140 receives data that is initially collected at the publisher's server 130 by the tracking package 135 and receives data when the beacon module 115 contacts the tracking server 140. The tracking server 140 correlates the data received from these two sources based on the unique identifier and stores the data for subsequent processing and reporting. In one embodiment, the tracking server receives data from a plurality of publisher's servers and from a variety of different mobile devices, and can correlate data from multiple sources. Another benefit of the tracking server 140 is that it may be whitelisted by one or more carrier gateways 120, and thus be allowed to receive MIN information for tracking purposes. The tracking server will be described in greater detail with respect to FIG. 3.

Figure 2:
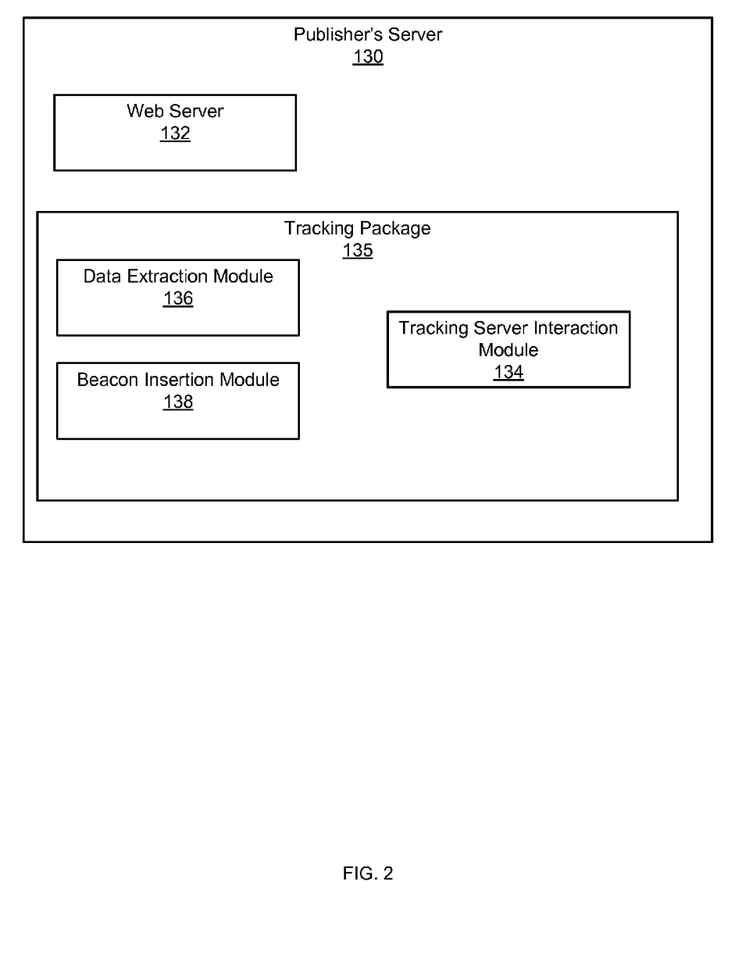
FIG. 2 is a block diagram of the publisher's server, in accordance with an embodiment of the invention.

FIG. 2 is a block diagram of the publisher's server, in accordance with an embodiment of the invention. As shown in FIG. 2, the publisher's server 130 includes a web server 132 and a tracking package 135 that includes a data extraction module 136, a tracking server interaction module 134, and a beacon insertion module 138.

The web server 132 receives a request for a web page 112 and serves the web page 112 over the network 101 to the requesting device. In one embodiment, the web page 112 is specifically designed to be viewed and accessed by a mobile device 110. Such pages are referred to as part of the "mobile web."

The data extraction module 136 of the tracking package 135 parses the request for the web page 112 received from the mobile device 110 and extracts data about the mobile device and the visit from the request. For example, the data extraction module 136 may extract data from the header information of the request. In one embodiment, the data extraction module 136 collects data such as usage data, browser data, device data, page data, unique user data, referrer data, and/or transport data from the mobile device's 110 request for the web page 112. In one specific embodiment, the data extraction module collects an HTTP user agent string, a request URI, a query string, an HTTP referrer, a source IP address of the browser, MD5 of the session ID, and all other HTTP headers.

The tracking server interaction module 134 of the tracking package 135 manages the communications between the publisher's server 130 and the tracking server 140. Specifically, the tracking server interaction module 134 receives the data extracted by the data extraction module 136 and sends the extracted data to the tracking server 140. In implementations that include the generation or selection of a unique identifier for a mobile device at the tracking server 140 (such as a publisher-defined unique username), the tracking server interaction module 134 also receives the unique identifier and sends it to the beacon insertion module 138. In implementations that include the selection of a unique identifier at the publisher's server 130, the tracking server interaction module 134 sends the selected unique identifier to the tracking server along with the extracted data.

The beacon insertion module 138 may receive the unique identifier from the tracking server interaction module 134 or another module of the publisher's server 130. The beacon insertion module inserts a beacon module 115 containing the unique identifier for the mobile device 110 into the web page 112. The beacon module 115 can be, for example, an image graphic tag, JavaScript, or some other form of code that is activated when the web page 112 loads in the browser 111. The beacon module 115 may also contain a mechanism to prevent caching requests at the carrier gateway 120 or other proxy. For example, the beacon module 115 may contain a random character string. Alternatively or additionally, the beacon module 115 may set a "no-cache" header parameter, but not all browsers and proxies support the "no-cache" header parameter.

Figure 3:
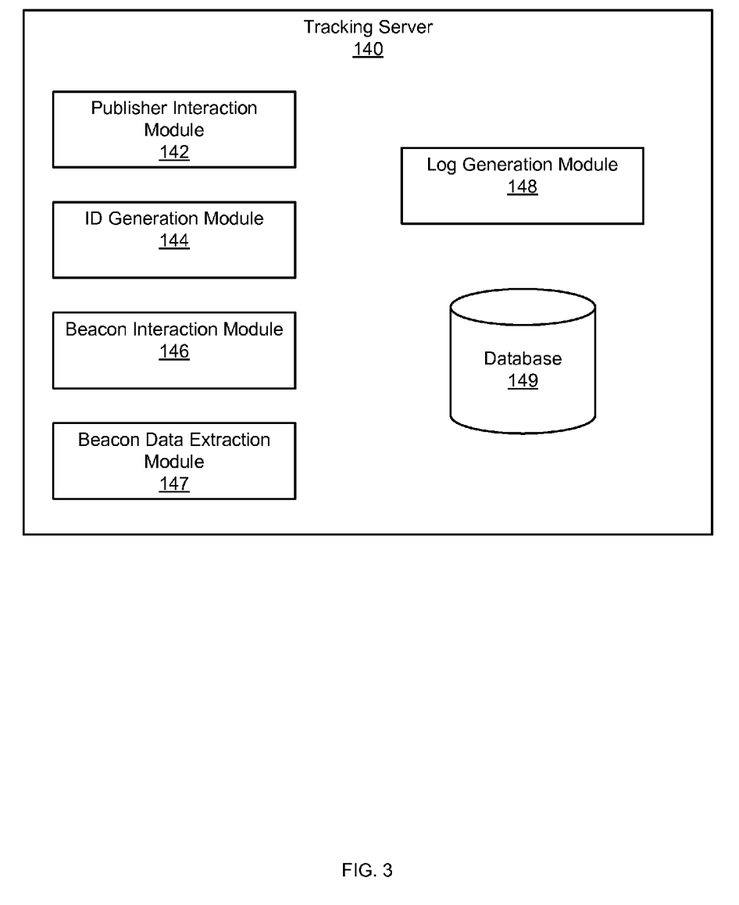
FIG. 3 is a block diagram of the tracking server, in accordance with an embodiment of the invention.

FIG. 3 is a block diagram of the tracking server 140, in accordance with an embodiment of the invention. The tracking server 140 includes a publisher interaction module 142, an ID generation module 144, a beacon interaction module 146, a beacon data extraction module 147, a log generation module 148, and a database 149.

The publisher interaction module 142 manages the communications between the publisher's server 130 and the tracking server 140. Specifically, the publisher interaction module 142 receives the extracted data sent by the tracking server interaction module 134 of the tracking package 135. In embodiments that include the generation or selection of a unique identifier at the publisher's server, the publisher interaction module 142 also receives the unique identifier along with the extracted data. In embodiments that include the generation or selection of a unique identifier at the tracking server 140, the publisher interaction module 142 sends the unique identifier to the publisher's server 130.

In some embodiments, the ID generation module 144 generates or selects a unique identifier for a mobile device request. Any technique of generating a unique identifier known to those of skill in the art can be used. In one embodiment, the unique identifier for a mobile device request is formed in part based on a hash of the hostname of the tracking server 140, an auto-incremented counter, and a time stamp in milliseconds. The ID generation module 144 sends the unique identifier for a mobile device request to the log generation module 148 to log with the extracted data associated with the respective mobile device.

The beacon interaction module 146 manages the communications with the beacon modules 115 on mobile devices 110. The beacon interaction module 146 receives and responds to requests from the beacon module 115. For example, in one embodiment, the beacon module is an image graphic tag. When the web page 112 is loaded by the browser 111 at the mobile device 110, the beacon module 115 is configured to contact the tracking server 140 to request a small image. The requested image can be, for example, a single-pixel transparent image. The request from the beacon module 115 is passed from the beacon interaction module 146 to the beacon data extraction module 147. The beacon interaction module 146 may respond to the request by sending the requested image to the mobile device 110. The beacon interaction module 146 may optionally return additional information to the browser 111 of the mobile device 110, such as tracking cookies, binary images, session tracking identifiers, or other data to aid in tracking. A cookie can be written/read during the interaction of the beacon module 115 and the beacon interaction module 146 that allows the tracking server 140 to more accurately identify a unique user identifier. For example, if the tracking server 140 is able to be white listed by the carrier gateway 120 for MIN, the MIN can be read in this interaction as well. In addition, the tracking server 140 may track the time difference between when the data was received from the tracking package 135 versus when the data is receive from the beacon module 115. In some cases, the data that is extracted by the beacon data extraction module 146 is redundant compared to the data extracted by the tracking package 135.

The beacon data extraction module 147 receives the communication from the beacon module 115 that has been passed on by the beacon interaction module 146. The communications to the tracking server 140 from the beacon module 115 include the unique identifier that was contained in the beacon module 115 when it was embedded in the web page 112 sent to the mobile device 110. The beacon data extraction module 147 extracts the unique identifier and extracts other identification and usage data from the communications from the beacon module 115. Specifically, the beacon data extraction module 147 may also extract tracking data, device data, page data, and/or usage data from the communications from the beacon module 115. Some of the data extracted by the beacon data extraction module 147 may be the same as the data extracted by the tracking package 135. In some cases, new data extracted by the beacon data extraction module 147 include a cookie identifier, the MIN information, and/or the time that the beacon data extraction module 147 received the data which can be used to determine overall latency. Of particular importance is the MIN information, which if the tracking server 140 is white listed by a carrier gateway 120, is a benefit to a plurality of publishers who may not be white listed. Similarly, if the publisher doesn't read/write cookies, the tracking server 140 can read/write cookies through the direct interaction that the tracking server 140 has with the browser 111 through the beacon module 115. As will be discussed in greater detail below, both MIN and cookies are ways to identify a unique user in the context of mobile devices accessing the Internet.

The log generation module 148 receives tracking data from multiple sources and stores the data in the database 149. The log generation module 148 receives extracted data through the publisher interaction module 142 from the data extraction module 136 of the tracking package 135 on the publisher's server 130. The log generation module 148 may also receive a unique identifier for a mobile device request associated with the extracted data from the ID generation module 144. The log generation module 148 further receives extracted data from the beacon data extraction module 147, including a unique identifier for the mobile device request from which the beacon module communicated the data. The log generation module 148 stores all the data keyed to the unique identifier for each mobile device request. Thus, the data can be correlated and subsequently processed for reporting. The log generation module 148 stores all the data in a database 149.

The database 149 stores all the tracking data. In one embodiment, the database 149 comprises the tracking data organized in fact tables of a relational database. The database 149 is shown as being internal to the tracking server 140 in FIG. 3. Alternatively, the database 149 can be replaced by another storage medium either internal to the tracking server 140, located elsewhere on the network 101, or otherwise communicatively coupled to the tracking server 140.

Figure 4:
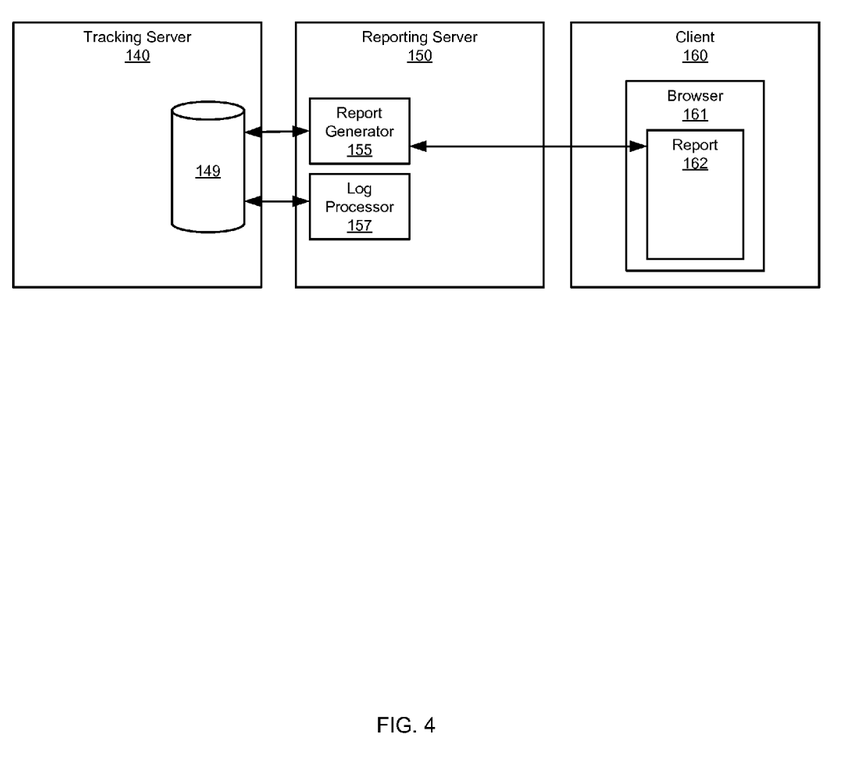
FIG. 4 is a high-level block diagram of the computing environment of the reporting server, in accordance with an embodiment of the invention.

FIG. 4 is a high-level block diagram of the computing environment of the reporting server 150, in accordance with an embodiment of the invention. The reporting server 150 includes a log processor module 157 and a report generator module 155. The log processor module 157 cleans, transforms, processes, filters, and formats the data stored in the database 149 into the relevant fact and dimension tables as well as tables which are optimized for reporting. The relevant fact and dimension tables can be stored back in the database 149 or an alternative storage location that is communicatively coupled to the reporting server 150. In some embodiments, the log processor module may pre-cache data to make the reports load faster. In one embodiment, responsive to a request from a browser 161 on a client 160, the report generator module 155 accesses data from the database 149 to generate reports 162. The reports 162 are customizable and deliverable in a variety of formats including but not limited to web pages, mobile web pages, raw text, and MICROSOFT EXCEL files. The reports 162 are viewable, for example, on a browser 161 of a client 160. The browser 161 may be a PC-based web browser or a mobile web browser, for example. Alternatively, the report may be delivered via an email application or another software application. The client 160 may be any type of computing device, including a personal digital assistant (PDA), a mobile phone, laptop or a computer.

Figure 5:
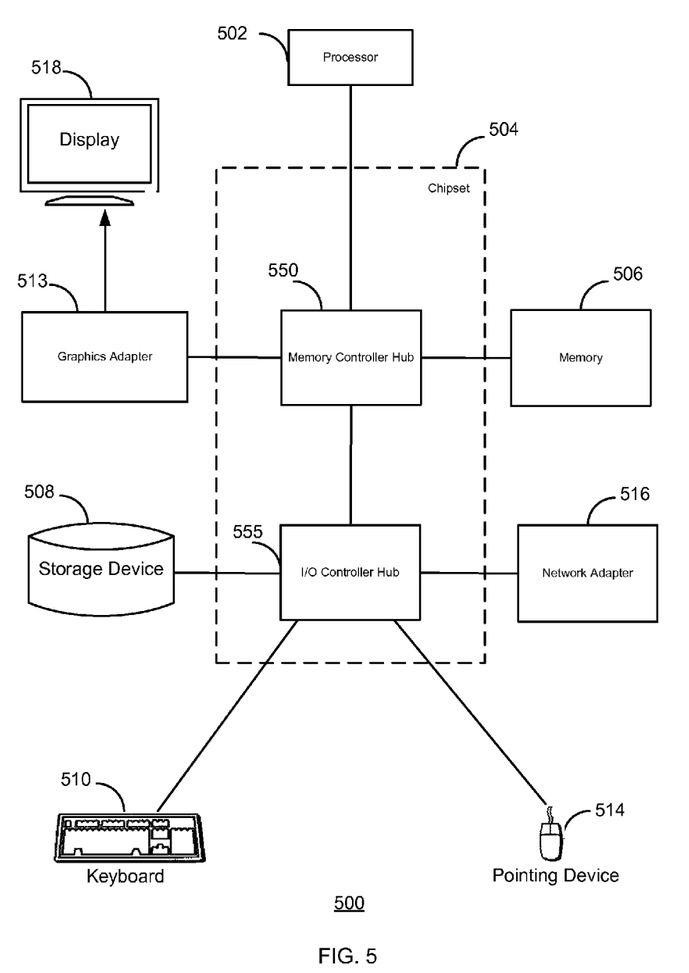
FIG. 5 is a high-level block diagram illustrating an example of a computer for use as a mobile device, publisher's server, tracking server, reporting server, or client, in accordance with an embodiment of the invention.

FIG. 5 is a high-level block diagram illustrating an example of a computer for use as a mobile device 110, a publisher's server 130, a tracking server 140, a reporting server 150, or a client 160, in accordance with an embodiment of the invention. Illustrated are at least one processor 502 coupled to a chipset 504. The chipset 504 includes a memory controller hub 550 and an input/output (I/O) controller hub 555. A memory 506 and a graphics adapter 513 are coupled to the memory controller hub 550, and a display device 518 is coupled to the graphics adapter 513. A storage device 508, keyboard 510, pointing device 514, and network adapter 516 are coupled to the I/O controller hub 555. Other embodiments of the computer 500 have different architectures. For example, the memory 506 is directly coupled to the processor 502 in some embodiments.

The storage device 508 is a computer-readable storage medium such as a hard drive, compact disk read-only memory (CD-ROM), DVD, or a solid-state memory device. The memory 506 holds instructions and data used by the processor 502. The pointing device 514 is a mouse, track ball, or other type of pointing device, and is used in combination with the keyboard 510 to input data into the computer system 500. The graphics adapter 513 displays images and other information on the display device 518. The network adapter 516 couples the computer system 500 to the communications network 101. Some embodiments of the computer 500 have different and/or other components than those shown in FIG. 5.

The computer 500 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

The types of computers 500 used by the entities of FIGS. 1-4 can vary depending upon the embodiment and the processing power used by the entity. For example, a mobile device 110 that is a mobile telephone typically has limited processing power, a small display 518, and might lack a pointing device 514. The publisher's server 130, in contrast, may comprise multiple blade servers working together to provide the functionality described herein.

Figure 6:
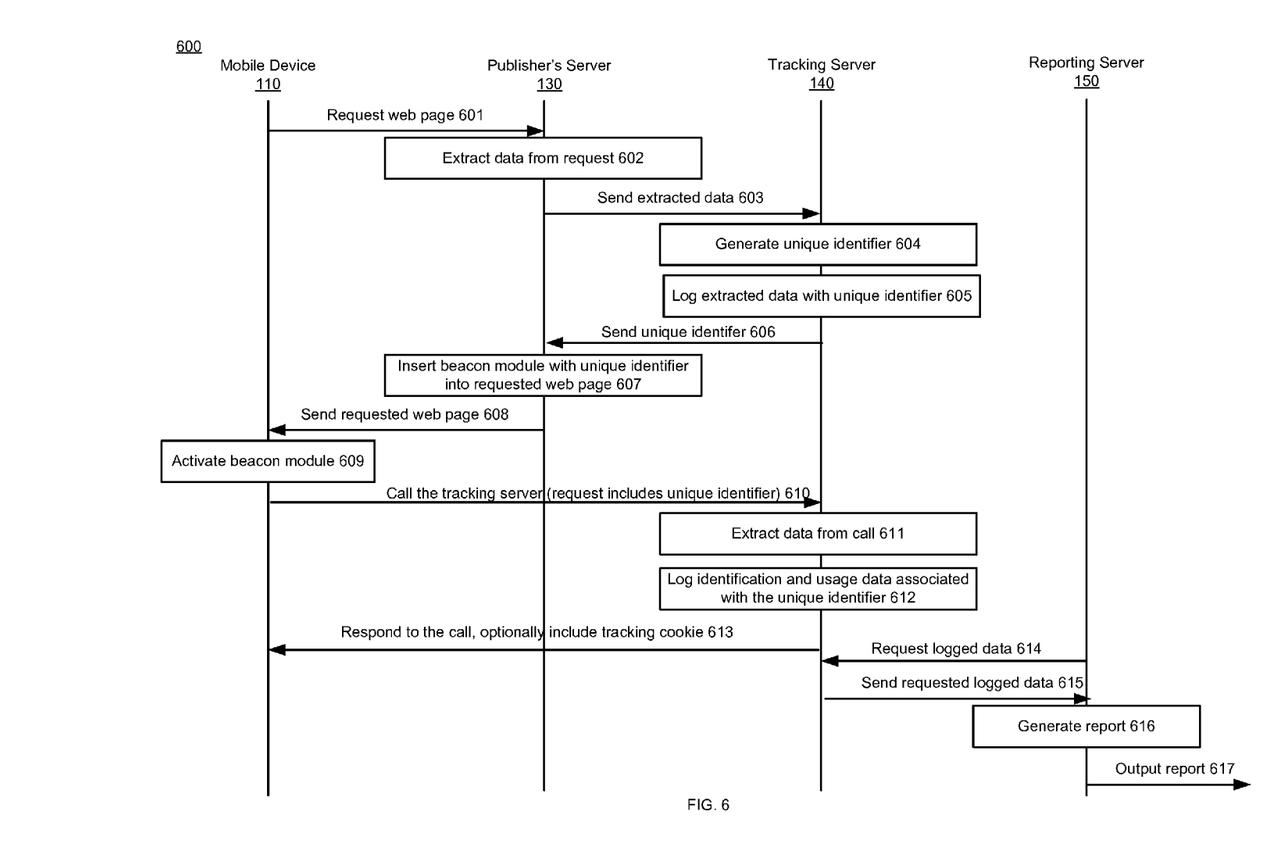
FIG. 6 is a transaction diagram illustrating a method of tracking mobile device visits to a web site, in accordance with an embodiment of the invention.

FIG. 6 is a transaction diagram illustrating a method 600 of tracking mobile device visits to a web site, in accordance with an embodiment of the invention. In step 601, a mobile device 110 requests a publisher's web page 112. The request for the web page includes data about the mobile device 110 and the visit by the mobile device to the web page 112. The data is included, for example, in the header information transmitted by the mobile device 110 as part of the request.

In step 602, the data is extracted from the request. In one embodiment, a data extraction module 136 of a tracking package 135 on the publisher's server 130 initially collects data such as data, browser data, device data, page data, unique user data, referrer data, and/or transport data from the mobile device's 110 request for the web page 112. In one specific embodiment, the data extraction module 136 collects an HTTP user agent string, a request URI, a query string, an HTTP referrer, a source IP address of the browser, a MD5 hash of the session ID, and all other HTTP headers.

In step 603, the extracted data is sent to the tracking server 140. In one embodiment, a tracking server interaction module 134 of the tracking package 135 on the publisher's server 130 sends the extracted data to a publisher interaction module 142 of the tracking server 140. In one embodiment, the tracking package 135 also sends any publisher-defined, unique user information from the publisher's server 130 to the tracking server 140.

In step 604, a unique identifier is generated for the mobile device request. In the embodiment shown in FIG. 6, the unique identifier is generated or selected at the tracking server 140, for example, by an ID generation module 144. In other embodiments, the unique identifier may be generated or selected at the publisher's server 130.

In step 605, the extracted data is logged with the unique identifier. In one embodiment, a log generation module 148 of the tracking server 140 logs the extracted data with the unique identifier in the database 149.

In step 606, the unique identifier is sent to the publisher's server. The unique identifier may be passed from the ID generation module 144 to the publisher interaction module 142 of the tracking server 140 to be transmitted to the tracking server interaction module 134 of the publisher's server 130. The tracking server interaction module 134 may send the unique identifier to the beacon insertion module 138 of the tracking package.

In step 607, a beacon module with the unique identifier is inserted into the requested web page 112. In one implementation, the beacon module is a code segment that includes the unique identifier for the request from the mobile device to which the web page 112 will be sent. The beacon module 115 may be an image tag, and it may include a random string to prevent caching by carrier gateways 120.

In step 608, the requested web page 112 is sent to the mobile device 110. The requested web page 112 includes the beacon module 115 that includes the unique identifier for the mobile device 110.

In step 609, the beacon module 115 is activated. For example, the beacon module may be activated by the browser 111 of the mobile device 110 loading the web page 112 that contains the beacon module 115.

In step 610, the beacon module 115 initiates a call to the tracking server 140. The communication to the tracking server 140 includes the unique identifier that was included in the beacon module 115. The communication may also include additional identification information and usage information such as user data, page data, header data, visit data, or device data. In one embodiment, the beacon interaction module 146 of the tracking server 140 receives the call from the beacon module 115.

In step 611, data is extracted from the communication from the beacon module 115. In one embodiment, the data includes the unique identifier of the mobile device 110 and additional identification and usage information such as user data, page data, header data, visit data, or device data. In some embodiments, the additional information includes a MIN inserted by a MIN Insertion mechanism 124 of the carrier gateway. In one embodiment, a beacon data extraction module 147 of the tracking server 140 receives the communication from the beacon interaction module 146 and performs the data extraction. Additional information may also be exchanged between the beacon module 115 and the tracking server 140 to aid in tracking users and usage. For example, the beacon data extraction module 147 may check if a user-tracking cookie and/or a visit-tracking cookie is present in the communication from the mobile device 110 and extract the data from them.

In step 612, the extracted data from the communication from the beacon module 115, including the additional identification and usage data, is logged with the unique identifier. In one implementation, the extracted data is passed from the beacon data extraction module 147 to the log generation module 148 that stores the extracted data in the database 149. The log generation module 148 stores all the data keyed to the unique identifier for each mobile device request 110. Thus, the data can be correlated and subsequently processed for reporting.

In step 613, the tracking server 140 responds to the call from the beacon module 115 of the mobile device 110. In one embodiment, a transparent 1-pixel image is sent to the mobile device in response to the call. Optionally, additional tracking devices, such a cookie or other tracking object, may be sent to the mobile device 110 as well. Although not shown in FIG. 6, the additional tracking device may subsequently communicate with the tracking server 140 so that additional information can be logged.

For each subsequent request for a web page from the mobile device 110, the method described above may be performed. Collectively, any mobile device 110 accessing any publisher's server 130 having a tracking package 135 can be tracked and analyzed using the methods described above.

In step 614, the reporting server 150 requests logged data from the database 149 of the tracking server 140. In some embodiments, a client 160 contacts a reporting server 150 to request the report 162, and the reporting server 150 in turn requests the data necessary to generate the report 162 from the tracking server 140. In step 615, the requested logged data is sent to the reporting server 150.

In step 616, a report 162 is generated. The log processor module 157 processes, filters, and formats the data stored in the database 149 for storage back in the database 149 or an alternative storage location that is communicatively coupled to the reporting server 150. After the data has been processed, a report generator module 155 of the reporting server generates the report 162. The report 162 is fully customizable to provide mobile analytics data across device types, individual mobile devices, or various other metrics tracked by the tracking server 140. The processing of the data and generation of a report 162 will be described in more detail with reference to FIG. 7.

In step 617, the generated report 162 is output. In one example, the report 162 is sent to a browser 161 of a client 160 for display. In another example, the report 162 is emailed, mailed, or faxed to a customer, publisher, advertiser, or other party.

Figure 7:
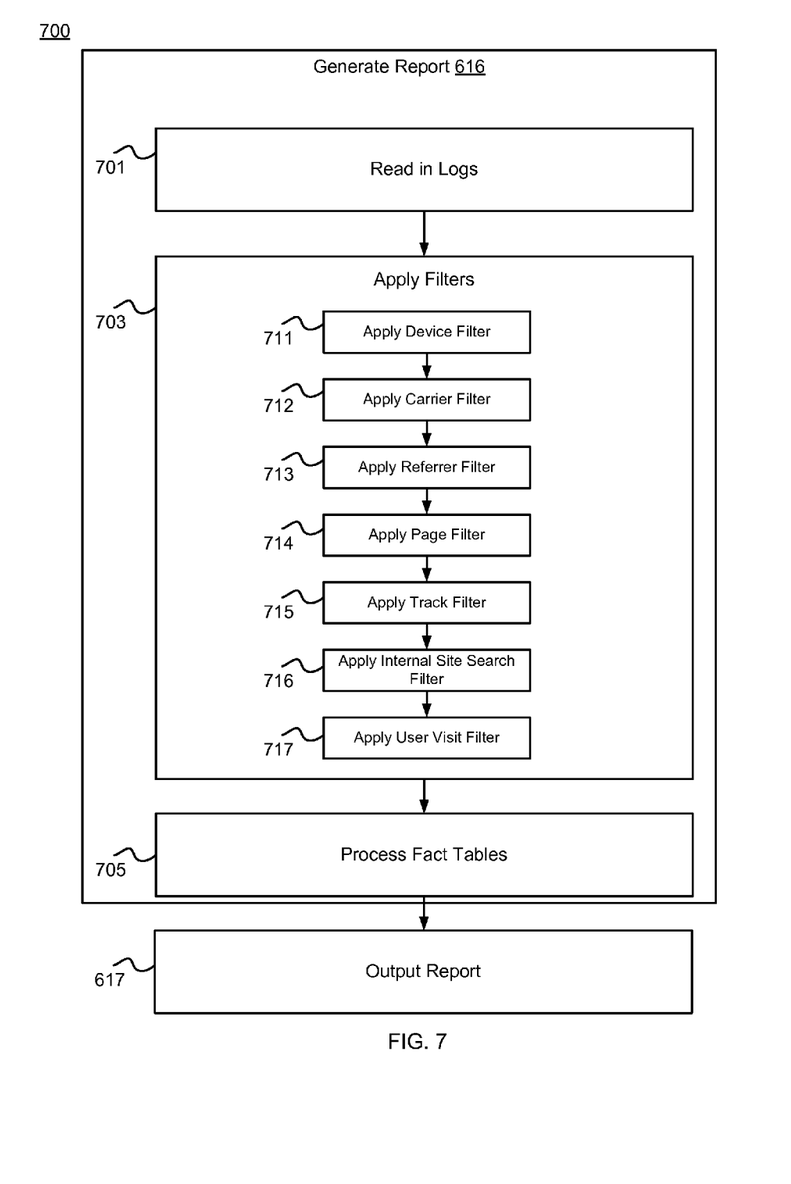
FIG. 7 is a flow chart illustrating a method of processing the logged data and generating a report, in accordance with an embodiment of the invention.

FIG. 7 is a flow chart illustrating a method 700 of processing the logged data, in accordance with an embodiment of the invention. A log processor module 157 of the reporting server 150 may clean, process, filter, and format the data as part of the step 616 of generating a report in preparation for the step 617 of outputting the report.

In step 701, the logs are read into the log processor module 157 of the reporting server 150. The logs include records stored in the database 149 by the log generation module 148 from information extracted by the data extraction module 136 of the tracking package 135 on the publisher's server 130, referred to as the publisher's log, and from information extracted by the beacon data extraction module 147, referred to as the beacon log.

In one embodiment, each record in the publisher's log represents a "hit" for the publisher. In one implementation, a check is made to ensure the "hit" is not from a known crawlers' user-agent. Optionally, a referrer type can be determined, which specifies whether there was no referrer, an internal referrer, a search referrer, or another external referrer. In some implementations, if the referrer was a search page, the search terms are parsed and recorded.

In one embodiment, each record in the beacon log represents a corresponding hit from the mobile device 110. Each record in the beacon log has an identifier that matches it to a hit from the publisher's server 130.

In step 703, filters are applied to transform the data. In one embodiment, the filters include a device filter, a carrier filter, a referrer filter, a page filter, a track filter, an internal site search filter, and a user visit filter. FIG. 7 illustrates one example order in which to apply the filters. In other embodiments, the filters may be applied in a different order or simultaneously (i.e., multi-threaded), and/or more, fewer, or different filters may be applied.

In step 711, a device filter is applied. The device filter sets the device identification and manufacturer identification. It is primarily based on the collected user-agent information. In one embodiment, if an exact match is not found, the data is flagged as unknown in a device table.

In step 712, a carrier filter is applied. The carrier filter sets the carrier identification and country identification. It is primarily based on the collected IP address, but may also be based on various header fields to determine the underlying carrier.

In step 713, a referrer filter is applied. The referrer filter updates the referrer identifications for all known referrers. A referrer is the previous page a user was on prior to arriving at the current page. It is useful for identifying how a user arrived at a site. For example, if a user searches for "pizza" on a search engine page and arrives at a publisher's web page, the referrer is the search engine, and more specifically a "pizza" search on the search engine. The referrer filter determines the type of referrer selected from the group of an internal referrer, an external referrer, search, or direct/none. An internal referrer means that the previous web page was a web page within the same website. An external referrer means that the previous web page was a web page from any other website. A search referrer is a subset of external referrers. A search referrer means that the previous web page was a search engine. In the case that a search engine is the referrer, the search terms are also reported in order to track which keywords drive traffic to the publisher's web page 112. The direct/none designation is used when a user types the address for the web page directly rather than clicking a link on another webpage. In this situation, there is no referrer.

In step 714, a page filter is applied. A dimension table maps the real names of pages to page identifiers. The page filter sets the page identifier for all known pages and adds new page names to the dimension table with new identifiers. Thus, the page identifiers can be used everywhere else in the fact tables rather than the real names of the pages. For reporting purposes, this reduces duplicate data in the database 149, and makes processing and reporting the data faster. When a report is generated, the page identifier is used to look up the real page name.

In step 715, a track filter is applied. In one implementation, a dimension table maps tracking identifiers to numeric identifiers. In one embodiment, tracking identifiers are free form text identifiers that are independent of the pages that publishers can use to identify any action or event (e.g., an account sign-up, a purchase) track an advertisement, roll up page types, or do A versus B testing. The filter looks up the tracking identifier to determine if it already exists in the tracking identifier dimension table. If so, the numeric identifier from the table is used. Otherwise, the tracking identifier is added to the table with a new numeric identifier. Thus, the numeric identifier can be used everywhere else in the fact tables rather than the tracking identifiers. For reporting purposes, this reduced duplicate data in the database 149, and makes processing and reporting the data faster. When a report is generated, the numeric identifier is used to look up the tracking identifier.

In step 716, an internal site search filter is applied. The site search filter sets the identifiers for the internal search engine and query terms and updates the related tables in the database 149. If a site has an internal search engine, a report can be generated to show what search terms are being entered. First, the URLs of known internal search engines are identified. If the page is accessed, the keywords used in the search are extracted. Then the internal site search filter operates similarly to the page filter and track filter described above. After parsing the search parameters, the internal site search filter checks if the term already exists in a search dimension table, and if so, uses the existing numeric identifier, or else creates a new entry with a new numeric identifier.

In step 717, a user visit filter is applied. The user visit filter sets the user identifier and the visit identifier for each entry in the database 149. In general, the task is to identify which entries in the database 149 correspond to the same user and to assign all of them the same unique user identifier, and to identify which entries in the database 149 correspond to the same visit and to assign all of them the same visit identifier. Some types of information collected in the database 149 are useful in identifying a unique user across multiple visits by the user. For example, publisher-defined unique-user information, MIN information, and user-tracking cookie data are all useful to track a unique user across multiple visits. Users that can be identified across visits are referred to herein as "persistent users."

If the publisher-defined unique-user information (such as a username) is present, it is preferentially used as the unique user identifier for tracking and reporting purposes. When present, the publisher-defined unique user information is preferred to uniquely identify users, for the convenience of publishers. The publishers can then see reports about unique users by the same identifiers as the publisher refers to them.

If there is no publisher-defined unique-user information, the next preference is to use MIN information as the unique user identifier, if MIN information is present. The MIN is the most accurate way to identify a unique-user, even across visits.

If no publisher-defined unique-user information nor MIN is present, the third preference is to use user-tracking cookie information as the unique-user identifier. The user-tracking cookie information is also useful for identifying persistent users because it does not change across visits.

If none of the foregoing is present, there are additional ways to identify a unique-user within the context of a single visit, but that do not apply across visits. A user who is uniquely identified only for single visit is referred to as a "transient user". A unique-user identifier can be assigned in the context of a single visit from a session identifier, if is present. If it is not present, then a unique-user identifier may be assigned based in part on a site identifier, a client IP address, a user agent, a carrier identifier, the pages viewed, the referrers present, unique HTTP header fields, and/or a time range, as will be described in greater detail with respect to FIG. 8.

Figure 8:
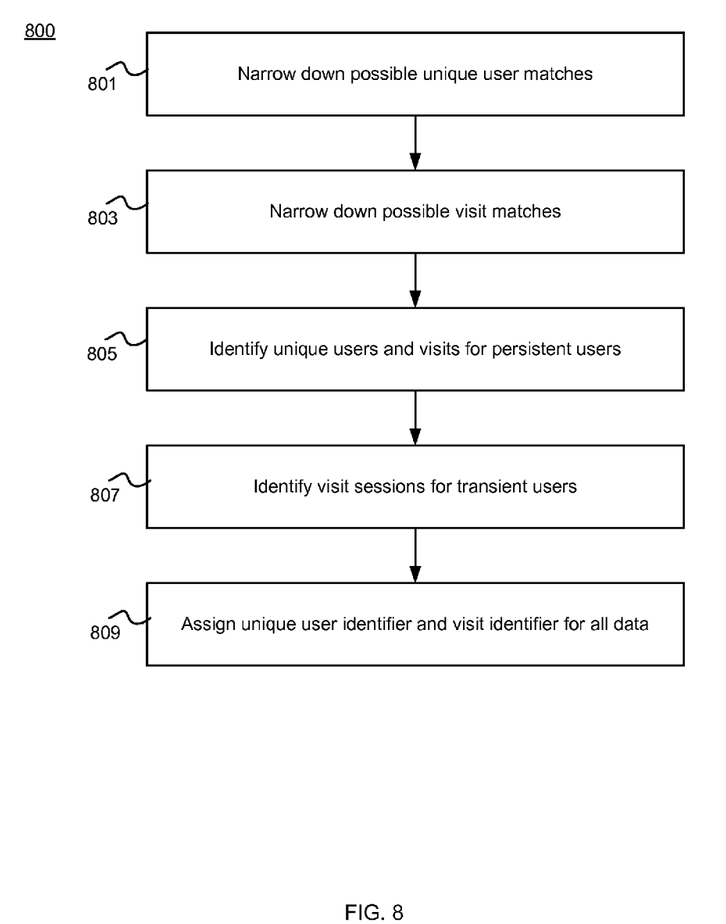
FIG. 8 illustrates a method of assigning unique user identifiers and visit identifiers, in accordance with one embodiment.

FIG. 8 illustrates a method of assigning unique user identifiers and visit identifiers, in accordance with one embodiment. In step 801, the possible matches among the records in the database 149 that could be the same unique user are narrowed down. In one embodiment, the MINs, cookies, session identifiers, user agents, carrier identifiers, HTTP header fields, and publisher specified fields are all considered to determine if two records in the database 149 are likely to be stemming from the same user's activity. The processing performed by applying the filters in step 703 facilitates this process of narrowing down the possible unique user matches. In one embodiment, a hash is generated from the MIN, cookies, session identifier, user agent, carrier, HTTP header fields, and the publisher specified fields for each record in the database 149. Then, the hashes are compared to narrow down the possible unique user matches. If the hash is the same for two entries, they still may or may not be from the same user.

In step 803, the possible matches among the records in the database 149 that could be from visits by a single user are narrowed down. In one embodiment, the hash generated in step 801 to narrow down the possible unique user matches is used in combination with a site identifier, cookie, and session identifiers, if present, to create a new hash. Then, the hashes are compared to narrow down the possible visit matches. If the hash is the same for two entries, they still may or may not be from the same visit by a user.

In step 805, the unique users and visits are identified for persistent users. Recall that persistent users are those users that have information in their records that allow the users to be tracked across multiple visit sessions (i.e., have publisher-defined unique user identifier, a MIN, or a user-tracking cookie). For each record, it is determined whether the persistent user is a previous user, in which case the existing unique user identifier is assigned, or if the persistent user is a new user, in which case a new unique user identifier is created. Then, the visit sessions corresponding to the persistent users are determined through a combination of technique involving the time on the site and/or cookie information. For example, if a record is categorized as belonging to a persistent user because a publisher-defined unique user identifier or a MIN is present in the record, the visit for the persistent user is determined to include those records of the possible matches that fall within a trailing 10 minute window. In other embodiments, a shorter or longer window can be used. If an entry is categorized as belonging to a persistent user because a cookie is present in the entry, then the visit is determined to include those records of the possible matches where the cookie is present. A new cookie is used for each visit.

In step 807, the visit sessions are identified for transient users. Recall that transient users are those users that cannot be tracked across visits because they do not have information in their records that allow the users to be tracked across multiple visit sessions (i.e., they do not have publisher-defined unique user identifier, a MIN, or a user-tracking cookie). In one embodiment, for records that have a session identifier present, the visit session is identified as including those records of the possible visit matches (i.e., the ones that have the same session identifier) that fall within a ten minute window. In other embodiments, a shorter or longer window can be used.

If no session identifier is present, then the visit session is determined based on a combination of factors, including the page, the referrer, and the time recorded in the entries in the database. Records are identified as being part of the same visit session of a single user if, among the possible visit matches, the referrer field is populated with a page that is anywhere in the previously recorded list of pages for that visit. Thus, the user's visit is reconstructed by traversing the path that the user took between pages by tracing the path back via the recorded referrer. For example, if a user visited web page A and selected a link to visit page B, and then selected a link to visit page C. The entry for the visit to page C would show page B as the referrer. Likewise, the entry for the visit to page B would show page A as the referrer. Thus, after the visit to page A has been determined to be part of a session, the visit to page B that shows A as a referrer would be identified as part of the same visit session for the user. In one embodiment, only the previous pages within a selected window, for example 10 minutes, are considered for potential matches for the same visit session.

In step 809, unique user identifier and visit identifier are assigned based on the results of sets 805 and 807. The assigned unique user identifiers and visit identifiers are mapped back to the data in the database 149 for use in reporting.

Referring back to FIG. 7, after the filters are applied 703, in step 705, the fact tables are processed by the log processor 157. The processing of the fact tables may occur at various intervals, for example once an hour or once every 24 hours. The fact tables can be aggregated for the day, week, month, or any other time period of interest. Subsequently, the report generator module 155 of the reporting server 150 can generate a report 162 based on the processed fact tables, and output the report in step 617 previously described.

The present invention has been described in particular detail with respect to several possible embodiments. Those of skill in the art will appreciate that the invention may be practiced in other embodiments.

The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method comprising:
   receiving data about a mobile device, the data extracted responsive to a request for a publisher's web page from a mobile device;
   generating, by a processor, a unique identifier for the mobile device request;
   logging the extracted data in association with the unique identifier;
   receiving a communication from a beacon module, the beacon module including the unique identifier and inserted into the requested web page;
   extracting the unique identifier and the usage data from the received communication;
   logging the extracted usage data in association with the unique identifier; and
   generating, by the processor, a report responsive to the logged data correlated by the unique identifier.

2. The method of claim 1, wherein the communication from the mobile device passes through a carrier gateway.

3. The method of claim 2, wherein the carrier gateway inserts a mobile identification number into the communication from the mobile device to a whitelisted tracking server, the method further comprising:
   extracting the mobile identification number from the received communication; and
   logging the mobile identification number in association with the unique identifier.

4. The method of claim 1, wherein the beacon module is configured to generate communication from the mobile device that includes the unique identifier.

5. The method of claim 4, wherein the beacon module comprises at least one selected from a group consisting of an image graphic tag and JavaScript.

6. The method of claim 1, further comprising:
processing the logged data to identify unique visitors to the publisher's web site.

7. The method of claim 6, wherein processing the logged data comprises applying a device filter, a carrier filter, a referrer filter, a page filter, a track filter, an internal site search filter, and a user visit filter.

8. A non-transitory computer-readable storage medium carrying one or more sequences of one or more instructions which, when executed by one or more processors, cause an apparatus to at least perform the following steps:
receiving data about a mobile device, the data extracted responsive to a request for a publisher's web page from a mobile device;
generating a unique identifier for the mobile device request;
logging the extracted data in association with the unique identifier;
receiving a communication from a beacon module, the beacon module including the unique identifier and inserted into the requested web page;
extracting the unique identifier and the usage data from the received communication;
logging the extracted usage data in association with the unique identifier; and
generating a report responsive to the logged data correlated by the unique identifier.

9. The non-transitory computer-readable storage medium of claim 8, wherein the communication from the mobile device passes through a carrier gateway.

10. The non-transitory computer-readable storage medium of claim 9, wherein the carrier gateway inserts a mobile identification number into the communication from the mobile device to a whitelisted tracking server, and wherein the apparatus is further caused to perform:
extracting the mobile identification number from the received communication; and
logging the mobile identification number in association with the unique identifier.

11. The non-transitory computer-readable storage medium of claim 8, wherein the beacon module is configured to generate communication from the mobile device that includes the unique identifier.

12. The non-transitory computer-readable storage medium of claim 11, wherein the beacon module comprises at least one selected from a group consisting of an image graphic tag and JavaScript.

13. The non-transitory computer-readable storage medium of claim 8, wherein the apparatus is further caused to perform:
processing the logged data to identify unique visitors to the publisher's web site.

14. The non-transitory computer-readable storage medium of claim 13, wherein processing the logged data to identify unique visitors to the publisher's web site comprises applying a device filter, a carrier filter, a referrer filter, a page filter, a track filter, an internal site search filter, and a user visit filter.

15. A system comprising:
a publisher interaction module for receiving extracted data about a mobile device, the data extracted responsive to a request for a publisher's web page from a mobile device;
a beacon interaction module for receiving communication from the beacon module, the communication including the unique identifier for the mobile device request and usage data, the beacon module including the unique identifier and inserted into the requested web page;
a beacon data extraction module for extracting the unique identifier and the usage data from the received communication;
a log generation module for logging the extracted data about the mobile device from the received request in association with the unique identifier and for logging the extracted usage data from the received communication in association with the unique identifier; and
a report generator module for generating a report responsive to the logged data correlated by the unique identifier.

16. The system of claim 15, wherein the communication from the mobile device passes through a carrier gateway.

17. The system of claim 16, wherein the carrier gateway inserts a mobile identification number into the communication from the mobile device to a whitelisted tracking server, and wherein the beacon data extraction module extracts the mobile identification number from the received communication, and wherein the log generation module logs the mobile identification number in association with the unique identifier.

18. The system of claim 15, wherein the beacon module is configured to generate communication from the mobile device that includes the unique identifier.

19. The system of claim 18, wherein the beacon module comprises at least one selected from a group consisting of an image graphic tag and JavaScript.

20. The system of claim 15, further comprising:
a log processor module for processing the logged data to identify unique visitors to the publisher's web site.

21. The system of claim 20, wherein processing the logged data to identify unique visitors to the publisher's web site comprises applying a device filter, a carrier filter, a referrer filter, a page filter, a track filter, an internal site search filter, and a user visit filter.

22. A method comprising:
receiving data about mobile devices and visits by the mobile devices to web pages, the data extracted responsive to requests for web pages from mobile devices to web page publishers;
determining to store the received data in a database, wherein each record of the database corresponds to a visit to a web page by a mobile device;
generating, by a processor, a first hash for each record of the database from received data about the mobile device and visit;
comparing the generated first hashes to narrow down possible matches between records, to identify multiple records possibly corresponding to a single user;
generating, by the processor, a second hash for each record of the database based at least in part on the first hash and, if present in the record, a website identifier, cookie information, and a session identifier,
comparing the generated second hashes to narrow down possible matches between records, to identify multiple records possibly corresponding to a single visit session of a single user;
identifying unique users and corresponding visits for records having at least one selected from a group consisting of a publisher-defined user identifier, a mobile identification number, and cookie information;
identifying visit sessions comprising a plurality of web page visits for records not having at least one selected from the group consisting of publisher-defined user identifier, a mobile identification number, and cookie information, wherein identifying a visit session comprises:

responsive to a session identifier being present in the record, identifying all matching records as belonging to the same session, where the matching records are identified among the multiple records possibly corresponding to a single visit session of a single user as falling within a first window of time;

responsive to no session identifier being present in the record, identifying all matching records as belonging to the same session, wherein the matching records are identified among the multiple records possibly corresponding to a single visit session of a single user by tracing back to previous records within a second window of time via an identified referrer;

assigning unique user identifiers and visit identifiers to the records of the database based on the identified unique users and visit sessions; and generating, by the processor, a report based on the unique user identifiers and visit identifiers.

* * * * *